United States Patent
Ren et al.

(10) Patent No.: US 10,796,119 B2
(45) Date of Patent: Oct. 6, 2020

(54) DECODING COLOR BARCODES

(71) Applicant: Hand Held Products, Inc., Fort Mill, SC (US)

(72) Inventors: Jie Ren, Jiangsu (CN); Jun Yin, Jiangsu (CN); Li Liu, Jiangsu (CN); Haiming Qu, Jiangsu (CN); HongJian Jin, Jiangsu (CN); Rui Hou, Jiangsu (CN); ZhiPeng Teng, Jiangsu (CN); Miansong Chen, Jiangsu (CN)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 21 days.

(21) Appl. No.: 16/044,655

(22) Filed: Jul. 25, 2018

(65) Prior Publication Data

US 2019/0034681 A1  Jan. 31, 2019

(30) Foreign Application Priority Data

Jul. 28, 2017  (CN) .......................... 2017 1 0629385

(51) Int. Cl.
*G06K 7/12* (2006.01)
*G06K 7/14* (2006.01)

(52) U.S. Cl.
CPC ............. *G06K 7/12* (2013.01); *G06K 7/1413* (2013.01)

(58) Field of Classification Search
CPC ................................ G06K 7/12; G06K 7/1413
See application file for complete search history.

(56) References Cited

U.S. PATENT DOCUMENTS

| | | | |
|---|---|---|---|
| 5,545,886 A * | 8/1996 | Metlitsky ........... | G06K 7/10574 235/462.42 |
| 6,375,075 B1 * | 4/2002 | Ackley .............. | G06K 7/10702 235/462.04 |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |

(Continued)

FOREIGN PATENT DOCUMENTS

| | | |
|---|---|---|
| WO | 2013/173985 A1 | 11/2013 |
| WO | 2013163789 A1 | 11/2013 |

(Continued)

OTHER PUBLICATIONS

U.S. Patent Application for a Laser Scanning Module Employing an Elastomeric U-Hinge Based Laser Scanning Assembly, filed Feb. 7, 2012 (Feng et al.), U.S. Appl. No. 13/367,978.

(Continued)

*Primary Examiner* — Christle I Marshall
(74) *Attorney, Agent, or Firm* — Alston & Bird LLP

(57) ABSTRACT

A method of decoding a color barcode involves simultaneously illuminating the color barcode with three light zones in a manner that illuminates each bar of the color barcode with each of the three spatially separated light zones, where the three light zones are each illuminated by a different one of three colors; capturing a monochrome image of light reflected off of the color barcode that includes each of the bars in the barcode illuminated by the three light zones; and for each bar in the color barcode, determining a color of the bar by analysis of the intensity of the light captured in the image of the reflected light intensity in each of the three light zones.

20 Claims, 5 Drawing Sheets

(56) References Cited

U.S. PATENT DOCUMENTS

| | | |
|---|---|---|
| 7,185,816 B1 | 3/2007 | Shoobridge |
| 7,413,127 B2 | 8/2008 | Ehrhart et al. |
| 7,726,575 B2 | 6/2010 | Wang et al. |
| 7,886,977 B2 * | 2/2011 | Wichers .............. G06K 7/12 235/454 |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,500,023 B2 * | 8/2013 | Zolotov ............. G06K 7/10722 235/462.04 |
| 8,517,271 B2 | 8/2013 | Kotlarsky et al. |
| 8,523,074 B2 * | 9/2013 | Marcus .............. G06K 7/12 235/454 |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,752,798 B2 | 6/2014 | Gao |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |

(56) References Cited

U.S. PATENT DOCUMENTS

| | | |
|---|---|---|
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Wang |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van Horn et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,443,123 B2 | 1/2016 | Hejl |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,261,398 B2 | 2/2016 | Amundsen et al. |
| 9,262,633 B1 | 2/2016 | Todeschini et al. |
| 9,262,660 B2 | 2/2016 | Lu et al. |
| 9,262,662 B2 | 2/2016 | Chen et al. |
| 9,262,664 B2 | 2/2016 | Soule et al. |
| 9,269,036 B2 | 2/2016 | Bremer |
| 9,270,782 B2 | 2/2016 | Hala et al. |
| 9,274,806 B2 | 3/2016 | Barten |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,667 B2 | 3/2016 | Caballero |
| 9,298,964 B2 | 3/2016 | Li et al. |
| 9,301,427 B2 | 3/2016 | Feng et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| 9,319,548 B2 | 4/2016 | Showering et al. |
| D757,009 S | 5/2016 | Oberpriller et al. |
| 9,342,723 B2 | 5/2016 | Liu et al. |
| 9,342,724 B2 | 5/2016 | McCloskey |
| 9,342,827 B2 | 5/2016 | Smith |
| 9,355,294 B2 | 5/2016 | Smith et al. |
| 9,361,882 B2 | 6/2016 | Ressler et al. |
| 9,365,381 B2 | 6/2016 | Colonel et al. |
| 9,367,722 B2 | 6/2016 | Xian et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,360,304 B2 | 7/2016 | Chang et al. |
| 9,383,848 B2 | 7/2016 | Daghigh |
| 9,384,374 B2 | 7/2016 | Bianconi |
| 9,390,596 B1 | 7/2016 | Todeschini |
| 9,396,375 B2 | 7/2016 | Qu et al. |
| 9,398,008 B2 | 7/2016 | Todeschini et al. |
| D762,604 S | 8/2016 | Fitch et al. |
| D762,647 S | 8/2016 | Fitch et al. |

(56) References Cited

U.S. PATENT DOCUMENTS

| | | |
|---|---|---|
| 9,405,011 B2 | 8/2016 | Showering |
| 9,407,840 B2 | 8/2016 | Wang |
| 9,411,386 B2 | 8/2016 | Sauerwein |
| 9,412,242 B2 | 8/2016 | Van Horn et al. |
| 9,418,252 B2 | 8/2016 | Nahill et al. |
| 9,418,269 B2 | 8/2016 | Havens et al. |
| 9,418,270 B2 | 8/2016 | Van Volkinburg et al. |
| 9,423,318 B2 | 8/2016 | Lui et al. |
| D766,244 S | 9/2016 | Zhou et al. |
| 9,443,222 B2 | 9/2016 | Singel et al. |
| 9,448,610 B2 | 9/2016 | Davis et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,488,986 B1 | 11/2016 | Solanki |
| 9,489,782 B2 | 11/2016 | Payne et al. |
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |
| 9,572,901 B2 | 2/2017 | Todeschini |
| 9,582,696 B2 | 2/2017 | Barber et al. |
| 9,606,581 B1 | 3/2017 | Howe et al. |
| D783,601 S | 4/2017 | Schulte et al. |
| 9,616,749 B2 | 4/2017 | Chamberlin |
| 9,618,993 B2 | 4/2017 | Murawski et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| D790,553 S | 6/2017 | Fitch et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 9,715,614 B2 | 7/2017 | Todeschini et al. |
| 9,734,493 B2 | 8/2017 | Gomez et al. |
| 10,019,334 B2 | 7/2018 | Caballero et al. |
| 10,021,043 B2 | 7/2018 | Sevier |
| 10,327,158 B2 | 6/2019 | Wang et al. |
| 10,410,029 B2 | 9/2019 | Powilleit |
| 2005/0011956 A1 | 1/2005 | Carlson |
| 2007/0063048 A1 | 3/2007 | Havens et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0243747 A1* | 9/2010 | Saito ............... G06K 19/06028 235/494 |
| 2011/0084143 A1* | 4/2011 | Liou ..................... G06K 7/12 235/462.42 |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0126618 A1* | 5/2013 | Gao ..................... G06K 7/10 235/469 |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0329006 A1 | 12/2013 | Boles et al. |
| 2013/0332524 A1 | 12/2013 | Fiala et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191913 A1 | 7/2014 | Ge et al. |
| 2014/0197239 A1 | 7/2014 | Havens et al. |

(56) References Cited

U.S. PATENT DOCUMENTS

| | | |
|---|---|---|
| 2014/0197304 A1 | 7/2014 | Feng et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0283282 A1 | 9/2014 | Dye et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0351317 A1 | 11/2014 | Smith et al. |
| 2014/0353373 A1 | 12/2014 | Van et al. |
| 2014/0361073 A1 | 12/2014 | Qu et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0009338 A1 | 1/2015 | Laffargue et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0069130 A1 | 3/2015 | Gannon |
| 2015/0083800 A1 | 3/2015 | Li et al. |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0178523 A1 | 6/2015 | Gelay et al. |
| 2015/0178534 A1 | 6/2015 | Jovanovski et al. |
| 2015/0178535 A1 | 6/2015 | Bremer et al. |
| 2015/0178536 A1 | 6/2015 | Hennick et al. |
| 2015/0178537 A1 | 6/2015 | El et al. |
| 2015/0181093 A1 | 6/2015 | Zhu et al. |
| 2015/0181109 A1 | 6/2015 | Gillet et al. |
| 2015/0186703 A1 | 7/2015 | Chen et al. |
| 2015/0193644 A1 | 7/2015 | Kearney et al. |
| 2015/0199957 A1 | 7/2015 | Funyak et al. |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0310243 A1 | 10/2015 | Ackley |
| 2015/0310389 A1 | 10/2015 | Crimm et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0092805 A1 | 3/2016 | Geisler et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr et al. |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Linwood |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Percorari et al. |
| 2016/0189092 A1 | 6/2016 | George et al. |
| 2016/0189284 A1 | 6/2016 | Mellott et al. |
| 2016/0189288 A1 | 6/2016 | Todeschini |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | DiPiazza et al. |
| 2016/0192051 A1 | 6/2016 | DiPiazza et al. |
| 2016/0125873 A1 | 7/2016 | Braho et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggert et al. |
| 2016/0204636 A1 | 7/2016 | Allen et al. |

(56) References Cited

U.S. PATENT DOCUMENTS

| | | |
|---|---|---|
| 2016/0204638 A1 | 7/2016 | Miraglia et al. |
| 2016/0316190 A1 | 7/2016 | McCloskey et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Geramine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschini et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | d'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bernhardt |
| 2017/0193461 A1 | 7/2017 | Jonas et al. |
| 2017/0193727 A1 | 7/2017 | Van Horn et al. |
| 2017/0200108 A1 | 7/2017 | Au et al. |
| 2017/0200275 A1 | 7/2017 | McCloskey et al. |

FOREIGN PATENT DOCUMENTS

| | | |
|---|---|---|
| WO | 2014/019130 A1 | 2/2014 |
| WO | 2014/110495 A1 | 7/2014 |

OTHER PUBLICATIONS

U.S. Patent Application for Indicia Reader filed Apr. 1, 2015 (Huck), U.S. Appl. No. 14/676,109.

U.S. Patent Application for Multifunction Point of Sale Apparatus With Optical Signature Capture filed Jul. 30, 2014 (Good et al.), U.S. Appl. No. 14/446,391.

* cited by examiner

FIG. 1
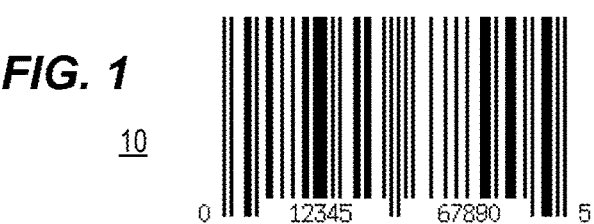
10
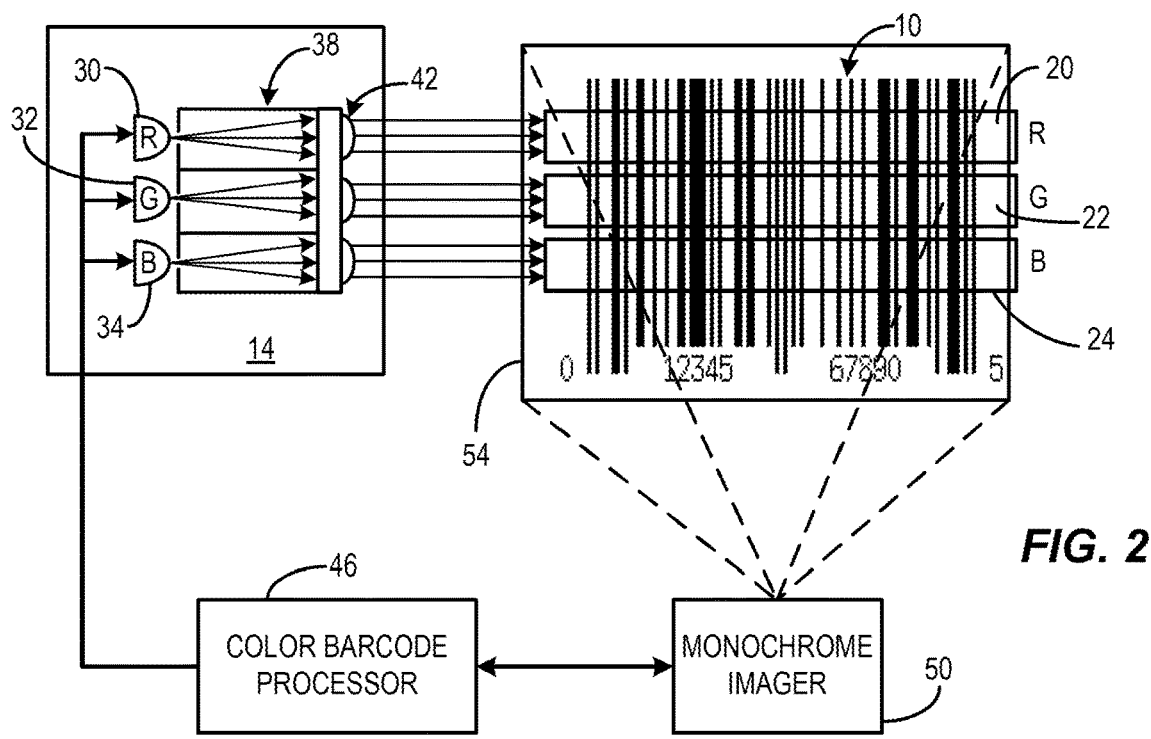
FIG. 2
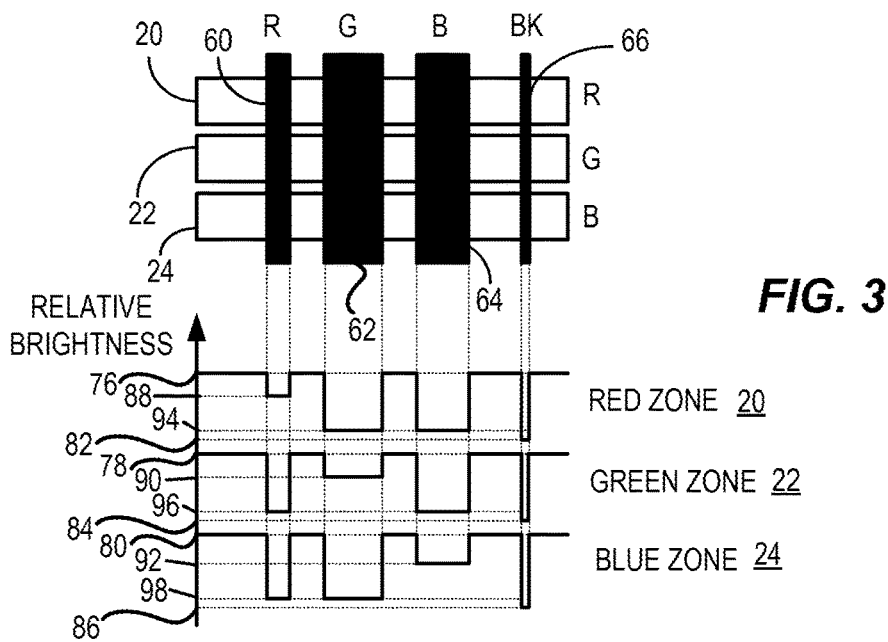
FIG. 3

DECODING COLOR BARCODES

CROSS-REFERENCE TO RELATED APPLICATION

The present application claims the benefit of Chinese Application for Invention No. 201710629385.1 for DECODING COLOR BARCODES filed Jul. 28, 2017, which is hereby incorporated by reference in its entirety.

FIELD OF THE INVENTION

The present invention relates to decoding color barcodes.

BACKGROUND

Generally speaking most image based barcode scanners use a gray scale sensor, which means the captured image of the barcode does not include color information. Universal Product Code (UPC) is widely used in the world for tracking trade items in stores. A single code is generally used to designate each type of trade item. In order to track each individual trade item, many solutions have been devised. One such solution involves adding one more code for each trade item as an addition to the UPC code. Another specific solution is printing the bar of the UPC code with different colors, and encoding unique information relating to the particular trade item by changing the color sequence of the bar. But conventional barcode scanners used to scan a UPC code cannot decode the encoded color information.

Therefore, a need exists for a system and method for decoding color barcodes.

SUMMARY

Accordingly, a method of decoding a color barcode consistent with certain embodiments involves simultaneously illuminating the color barcode with three spatially separated light zones in a manner that illuminates each bar of the color barcode with each of the three spatially separated light zones; where the three light zones are each illuminated by a different one of three colors; capturing a monochrome image of light reflected from of the color barcode that includes each of the bars in the barcode illuminated by each of the three light zones; for each bar in the color barcode, determining a color of the bar by analysis of the intensity of the light captured in the image of the reflected light intensity for each bar in each of the three spatially separated light zones.

The three light zones just described could actually be two or more light zones in a similar method of decoding a color barcode involving simultaneously illuminating the color barcode with at least two spatially separate light zones in a manner that illuminates each bar of the color barcode with each of the at least two spatially separate light zones; where the at least two light zones are each illuminated by a different color; capturing a monochrome image of light reflected from of the color barcode that includes each of the bars in the barcode illuminated by each of the at least two light zones; where for each bar in the color barcode, determining a color of the bar by analysis of the intensity of the light captured in the image of the reflected light intensity for each bar in each of the at least two spatially separated light zones.

In certain example embodiments, the intensity of the light reflected from the color barcode and captured in the image is represented by N colors C1 through CN; and where determining the color of each bar is carried out by determining the relative intensity of the values of C1 through CN. In certain example embodiments, determining the color of each bar for three colors is further carried out by comparison of the relative intensity of the differences between the values of C1, C2, and C3 with threshold intensity levels. In certain example embodiments, determining the color of each bar is carried out by comparison of the relative intensity of the differences between the values of C1, C2, and C3 with predetermined threshold intensity levels for a three color embodiment. In certain example embodiments, the colors of the at least two light zones comprise at least two of red, green, and blue.

In certain example embodiments, the intensity of the light reflected from the color barcode and captured in the image is represented by C1, C2, and C3; and determining the color of each bar is carried out by determining the relative intensity of the values of C1, C2, and C3. In certain example embodiments, determining the color of each bar is further carried out by comparison of the relative intensity of the differences between the values of C1, C2, and C3 with threshold intensity levels. In certain example embodiments, determining the color of each bar is carried out by comparison of the relative intensity of the differences between the values of C1, C2, and C3 with predetermined threshold intensity levels.

In certain example embodiments, the three colors of the three light zones comprise red, green, and blue. In certain example embodiments, the intensity of the light reflected from the color barcode and captured in the image is represented by R, G, and B for the intensity of the red, green, and blue light respectively; and determining the color of each bar is carried out by determining the relative intensity of the values of R, G, and B. In certain example embodiments, determining the color of each bar is further carried out by comparison of the relative intensity of the differences between the values of R, G, and B with threshold intensity levels. In certain example embodiments, the intensity of the light reflected from the color barcode and captured in the image is represented by R, G and B for the intensity of the red, green and blue light respectively; and determining the color of each bar is carried out by comparison of the relative intensity of the differences between the values of R, G and B with threshold intensity levels.

In certain example embodiments, the intensity of the light reflected from the color barcode and captured in the image is represented by R, G and B for the intensity of the red, green and blue light respectively;

where a bar is determined to be red if:

$R>G$ and $|\Delta RG|>TRG;$ $R>B$ and $|\Delta RB|>TRB;$ and $|\Delta GB|<TGB,$ where $|\Delta RB|$ is the absolute value of the difference between R and B, where $|\Delta GB|$ is the absolute value of the difference between G and B, and where $|\Delta RG|$ is the absolute value of the difference between R and G, and where TRG, TRB and TGB are predetermined threshold values.

In certain example embodiments, the intensity of the light reflected from the color barcode and captured in the image is represented by R, G and B for the intensity of the red, green and blue light respectively;

where a bar is determined to be green if:

$G>R$ and $|\Delta RG|>TRG;$ $G>B$ and $|\Delta GB|)>TGB;$ and $|\Delta RB|<TRB,$ where |ΔRB| is the absolute value of the difference between R and B, where |ΔGB| is the absolute value of the difference between G and B, and where |ΔRG| is the absolute value of the difference between R and G, and where TRG, TRB and TGB are predetermined threshold values.

In certain example embodiments, the intensity of the light reflected from the color barcode and captured in the image is represented by R, G and B for the intensity of the red, green and blue light respectively;

where a bar is determined to be blue if:

$B>R$ and $|\Delta RB|>TRB;$ $B>G$ and $|\Delta GB|>TGB;$ and $|\Delta RG|<TRG,$ where |ΔRB| is the absolute value of the difference between R and B, where |ΔGB| is the absolute value of the difference between G and B, and where |ΔRG| is the absolute value of the difference between R and G, and where TRG, TRB and TGB are predetermined threshold values.

In certain example embodiments, the intensity of the light reflected from the color barcode and captured in the image is represented by R, G and B for the intensity of the red, green and blue light respectively;

where a bar is determined to be black if:

$|\Delta RB|<TRB;$ $|\Delta GB|<TGB;$ and $|\Delta RG|<TRG,$ where |ΔRB| is the absolute value of the difference between R and B, where |ΔGB| is the absolute value of the difference between G and B, and where |ΔRG| is the absolute value of the difference between R and G, and where TRG, TRB and TGB are predetermined threshold values.

In certain example embodiments, the intensity of the light reflected from the color barcode and captured in the image is represented by R, G and B for the intensity of the red, green and blue light respectively;

where a bar is determined to be red if:

$R>G$ and $|\Delta RG|>TRG,$ $R>B$ and $|\Delta RB|>TRB,$ and $|\Delta GB|<TGB;$ where a bar is determined to be green if:

$G>R$ and $|\Delta RG|>TRG,$ $G>B$ and $|\Delta GB|)>TGB,$ and $|\Delta RB|<TRB;$ where a bar is determined to be blue if:

$B>R$ and $|\Delta RB|>TRB,$ $B>G$ and $|\Delta GB|>TGB,$ and $|\Delta RG|<TRG;$ and where a bar is determined to be black if:

$|\Delta RB|<TRB,$ $|\Delta GB|<TGB,$ and $|\Delta RG|<TRG,$ where |ΔRB| is the absolute value of the difference between R and B, where |ΔGB| is the absolute value of the difference between G and B, and where |ΔRG| is the absolute value of the difference between R and G, and where TRG, TRB and TGB are predetermined threshold values.

Another example embodiment of a method of decoding a color barcode involves simultaneously illuminating the color barcode with three spatially separated light zones in a manner that illuminates each bar of the color barcode with each of the three spatially separated light zones; where the three light zones are illuminated by red light, green light and blue light respectively; capturing a monochrome image of light reflected from the color barcode that includes each of the bars in the barcode illuminated by each of the three light zones; for each bar in the color barcode, determining a color of the bar by analysis of the intensity of the light captured in the image of the reflected light intensity in each of the three spatially separated light zones.

In certain example embodiments, the intensity of the light reflected from the color barcode and captured in the image is represented by R, G, and B for the intensity of the red, green, and blue light respectively; and determining the color of each bar is carried out by determining the relative intensity of the values of R, G, and B. In certain example embodiments, determining the color of each bar is further carried out by comparison of the relative intensity of the differences between the values of R, G, and B with threshold intensity levels. In certain example embodiments, determining the color of each bar is carried out by comparison of the relative intensity of the differences between the values of R, G, and B with threshold intensity levels.

In certain example embodiments, the intensity of the light reflected from the color barcode and captured in the image is represented by R, G and B for the intensity of the red, green and blue light respectively;

where a bar is determined to be red if:

$R>G$ and $|\Delta RG|>TRG,$ $R>B$ and $|\Delta RB|>TRB,$ and $|\Delta GB|<TGB;$ where a bar is determined to be green if:

$G>R$ and $|\Delta RG|>TRG,$ $G>B$ and $|\Delta GB|)>TGB,$ and $|\Delta RB|<TRB;$ and where a bar is determined to be blue if:

$B>R$ and $|\Delta RB|>TRB,$ $B>G$ and $|\Delta GB|>TGB,$ and $|\Delta RG|<TRG,$ and where |ΔRB| is the absolute value of the difference between R and B, where |ΔGB| is the absolute value of the difference between G and B, and where |ΔRG| is the absolute value of the difference between R and G, and where TRG, TRB and TGB are predetermined threshold values.

In certain example embodiments, a bar is determined to be black if:

$|\Delta RB|<TRB;$ $|\Delta GB|<TGB;$ and $|\Delta RG|<TRG.$

Another example method of decoding a color barcode involves simultaneously illuminating the color barcode with a plurality of spatially separated light zones in a manner that illuminates each bar of the color barcode with each of the plurality of spatially separated light zones; where the plurality of spatially separated light zones are each illuminated by a different colors; capturing a monochrome image of light reflected from the color barcode that includes each of the bars in the barcode illuminated by each of the plurality of light zones; for each bar in the color barcode, determining a color of the bar by analysis of the intensity of the light captured in the image of the reflected light intensity for each bar in each of the plurality of spatially separated light zones.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 1 depicts an example of a color barcode.

FIG. 2 depicts an example system for reading and decoding a color barcode in a manner consistent with certain embodiments of the present invention.

FIG. 3 depicts an example of the light intensities reflected from a color bar code in a manner consistent with certain embodiments of the present invention.

DETAILED DESCRIPTION

Figure 4:
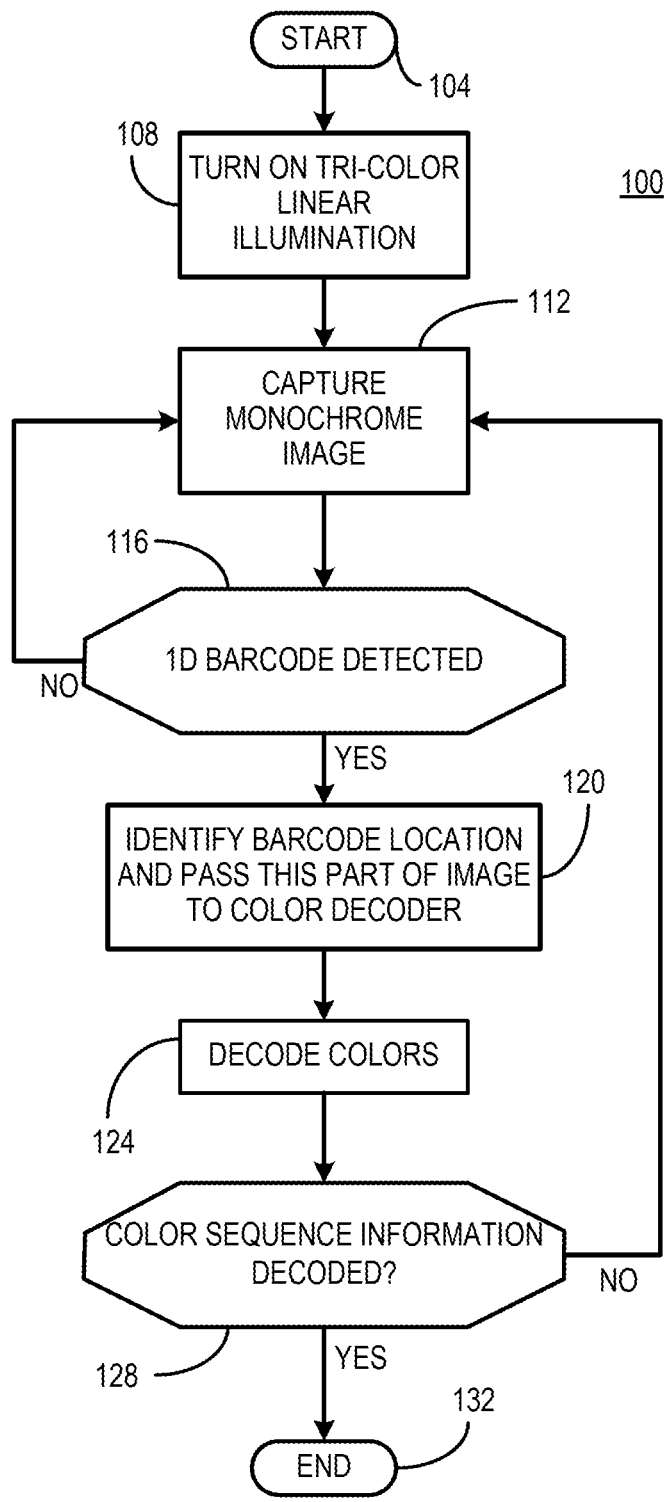
FIG. 4 is an example flow chart of an example overall decoding process consistent with certain embodiments of the present invention.

The present invention embraces methods for decoding color barcodes. FIG. 1 shows an example of a color UPC barcode 10 that is made up of a plurality of vertical stripes of various widths. In a conventional UPC barcode, all of the vertical bars are black or all the same color. With a color barcode, the vertical bars may be color coded to provide additional information. In the example that follows, it is assumed that the bars can take on the colors red, green, blue, or black in order to encode additional information beyond that which is normally encoded in a UPC barcode.

The method uses multiple (e.g., three) colors of illumination simultaneously projected on the barcode in multiple (e.g., three) separate regions. Each light source produces a unique wavelength/color of light to illuminate the optical color barcode. The light reflected from the color barcode in each of the three example regions (or zones) is then analyzed to determine the color of each bar. The disclosed methods exhibit High motion tolerance. A single captured image (i.e., a single frame) includes the barcode information under three different lights, thus there is no need to activate LEDs in a time sequence or utilize multiple images in the analysis. The hardware used to implement the method is low and one frame of data is easier to process than multiple frames in combination. The three illumination zones form a tri-color bar that serves as an aimer to point at the barcode, and it indicate which barcode is decoded when there is more than one barcode presented in the field of view. The location and sequence of the three color zones in the captured image are relatively fixed, so the complexity of the signal processing is lower than a method need to handle multi-frames.

For purposes of this document, the term "spatially separate (d) light zones" means that the light zones illuminate multiple areas that are separated in space. Adjacent light zones may have regions which overlap so long as there is not complete overlap so that there are areas in each light zone that is illuminated by a single light source (or filtered light source).

In the present example embodiments, color barcodes are decoded using a two dimensional monochromatic imager with the barcode illuminated by a tri-color linear illuminator. The system can decode the color sequence based UPC code or other type of 1D barcode.

In an example embodiment, a 2D monochromatic imager based decoding system and method for a color sequence based one dimensional barcode is provided in which a tri-color, e.g. red, green, blue, illumination is used to simultaneously capture color information from three zones of the color barcode with a two dimensional monochromatic sensor (mono-sensor). A color decoder analyses the signals output from the three zones, illuminated by three different color illumination and compares the brightness of each bar to decide the bar's color. The color decoder then decodes the encoded information according to the appropriate encoding standard.

In this example, a tri-color, e.g. red, green and blue illumination, is designed to capture color information of the color barcode with the two dimensional monochromatic sensor. The three colors of red, green, and blue are used in this example and can be used to identify any color bars that can be represented within an RGB color space. In this illustrative example, three color zones are used and bars of three colors plus black are recognized. However, in other example embodiments, other color spaces can be used, more or less than three color light zones can be used, and the system can detect two or more colors with or without black bar detection as will be described. Those skilled in the art will appreciate that many variations are possible upon consideration of the present teachings.

Bars, making up the barcode, that have the same or similar color as the illumination will reflect more light back to the mono-sensor than the other bars which have different color. Hence, that portion of bar's image is brighter than other bars illuminated by the other two colors of illumination. By comparing the brightness of the same bar within different color illuminated zone, the system can determine the color of the bar as an output.

FIG. 2 shows an example system in accord with the present teachings in which color barcode 10 is illuminated from a tri-color light source shown generally as 14 so as to produce three distinct illuminated regions or zones horizontally across the barcode. Three color zones can identify the corresponding three colors of bars in the bar code and can also identify black bars. Methods for detection of additional colors are also possible by suitable modification of the detection methods described. The upper region 20 is illuminated with red light and is also designated 'R' for convenience. The middle region 22 is designated 'G' and represents the green light illuminated region or zone. The lower region 24 is designated 'B' and represents a region or zone illuminated by blue light.

The three illumination zones 20, 22 and 24 can be produced by any suitable mechanism such as that shown, for example, as 14. In this example, three light emitting diodes (LEDs) 30, 32, and 34 respectively produce red, green, and blue light. The light passes through one of three slits to illuminate three chambers 38 that keep the light from each of the LEDs separate. Light then passes through a lens assembly 42 made up of three lenses, one for each color, which focuses the light output to produce three separate bands of light 20, 22 and 24. Variations will occur to those skilled in the art upon consideration of the present teachings.

The LEDs may operate under control of a programmed processor 46 or may be turned on continuously. Processor 46 is used to process the information received from a monochromatic imager device 50 that is used to capture an image of the barcode (e.g., in the region shown by box 54). The processor 46 can then examine the captured image to identify the three illumination zones and examine the intensity of light reflected from each of the three separate zones in order to differentiate the colors of the bars.

The positions of the three linear illumination zones are stored in the color analysis function carried out in processor 46, and the processor analyzes the signals within the zones illuminated by the three color light.

The bars may be printed on paper or otherwise depicted. Bars which have the same or similar color as the illumination will reflect more light back to the mono-sensor 50 than the other bars which have different color. Hence, the portion of bar's image is brighter in the zone having similar illumination than the other portions illuminated by the other two colors illumination. Black colored bars have lower light intensity in the reflected image than colored bars and white areas between bars have the highest intensity.

Turning to FIG. 3, in the upper portion of the illustration, four bars from a color barcode 10 are depicted as a red bar 60, a green bar 62 and blue bar 64 and a black bar 66. These bars are illuminated by in a red zone 20, a green zone 22, and a blue zone 24. At the lower portion of the illustration is a graphical representation of the reflected light in each of the red zone 20, green zone 22, and blue zone 24 in terms of relative brightness. The three graphs are for reflected light in each of the three zones and are shown in alignment with the bars 60, 62, 64 and 66. Greater intensity is indicated by higher levels in the direction of the arrow at the left of the graphs.

As illustrated, light will reflect from the bars with intensity that varies with the color of the light and the color of the bar. White space between bars will reflect the most and exhibit the highest levels of intensity shown as 76, 78, and 80 on the graphs. Similarly, the lowest level of intensity is reflected by the black bar 66 shown at levels 82, 84 and 86. Bar 60 is a red bar and its reflected brightness is greatest in the red light zone with a level shown as 88. Similarly, the brightest reflection of the green bar 62 is under illumination in the green zone and is shown as 90. Blue bar 64 reflects with the greatest brightness under blue illumination in the blue zone shown as 92.

Under illumination in the red zone 20, the blue and green bars 62 and 64 reflect relatively low levels of light indicated by level 94. While these are shown as the same for convenience, some variation is to be expected, but these bars will always reflect less in the red zone 20 than the red bar 60.

Similarly, under illumination in the green zone 22, the red and blue bars 60 and 64 reflect relatively low levels of light indicated by level 96. While these are shown as the same for convenience, some variation is to be expected, but these bars will always reflect less in the green zone 22 than the green bar 62.

Similarly, under illumination in the blue zone 24, the red and green bars 60 and 62 reflect relatively low levels of light indicated by level 98. While these are shown as the same for convenience, some variation is to be expected, but these bars will always reflect less in the blue zone 24 than the blue bar 64.

The color barcode processor 46 analyzes signals the from the monochrome imager 50 output in the three zones 20, 22 and 24 illuminated by three different colors of illumination (red, green and blue in this example, but this is not to be considered limiting), and compares the brightness of same bar in each zone in order to determine the bar's color. With each bar's color determined, the processor 46 can decode the encoded information according to the appropriate encoding standard. The decoding function analyzes the gray scale image of the code, and decodes the information encoded in the barcode symbol.

FIG. 4 depicts a process 100 for decoding a one dimensional (1D) barcode in accord with certain example embodiments starting at 104. At 108, the tri-color illumination is turned on to provide the three colors of illumination. At 112, a monochromatic image is captured at imager 50 and the image is inspected to see if there is a 1D barcode in the image at 116. If not, another image is captured at 112 in order to continue looking for a barcode image. But, if a 1D barcode image is detected at 118, the barcode location is identified, and this part of the captured image can be passed on to the color decoding process at 120. At 124, the colors are decoded, and a determination is made as to whether or not color sequence information has been properly decoded at 128. If not, the process begins again at 112. If so, the process is complete and ends at 132.

Figure 5:
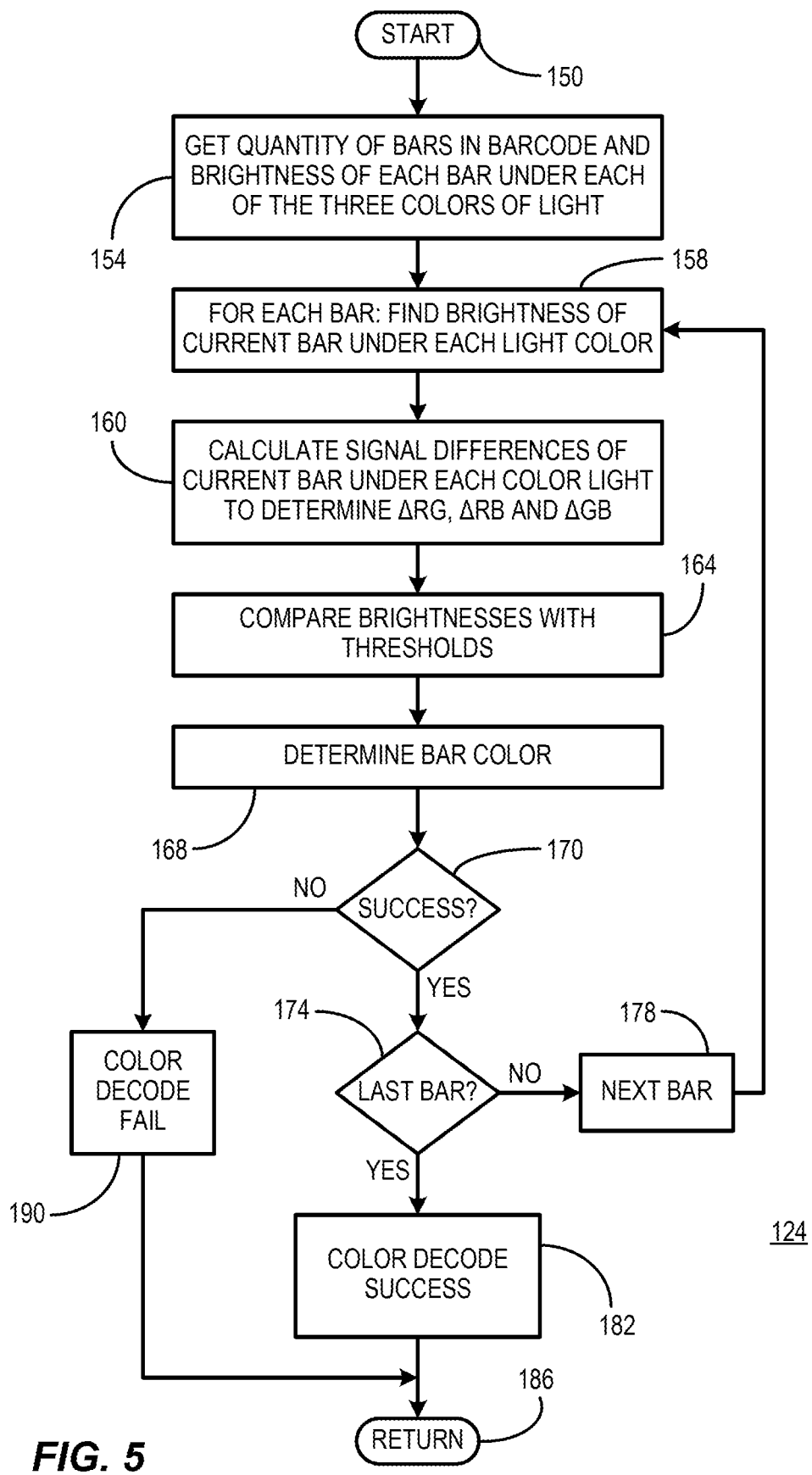
FIG. 5 is an example flow chart of an example color decoding process consistent with certain embodiments of the present invention.

The decoding is carried out in 124 in an example process detailed in FIG. 5 starting at 150. At 154, the process starts by determining the number of bars in the barcode and the brightness level of each bar in the three zones of colored light 20, 22, and 24. At 158, for each of the identified bars in the barcode, the process examines the reflected light and determines the brightness of each bar under illumination by each color light (by measuring the intensity in each of the three zones 20, 22 and 24). At 160, the signal level differences for the current bar are calculated for each of the three zones. This results in three difference numbers for the difference between red and blue, red and green, and green and blue for each bar. These differences are designated:

$\Delta RG$=Red light signal−Green light signal=$R-G$;

$\Delta RB$=Red light signal−Blue light signal=$R-B$; and $\Delta GB$=Green light signal−Blue light signal=$G-B$.

These brightness differentials are then compared with a set of threshold values at 164. The actual thresholds used can be determined and optimized experimentally for a particular set of hardware being used. As a starting point for determining the thresholds, consider the following:

$T_{RG}$ is a threshold value that establishes a minimum difference between the intensity R and the intensity G of the red and green reflected illumination from the bar code respectively to differentiate red from green. In one example embodiment, the intensity of reflected light from a known red bar can be measured in the red and green zones. The threshold $T_{RG}$ can be set, for example at one half of the difference between the reflected intensity in the red zone minus the reflect intensity in the green zone (i.e., |R−G|/2). From there, the threshold can be experimentally optimized.

Similarly, $T_{RB}$ is a threshold value that establishes a minimum difference between the intensity R and the intensity B of the red and blue reflected illumination from the bar code respectively to differentiate red from blue. In one example embodiment, the intensity of reflected light from a known red bar can be measured in the red and blue zones. The threshold $T_{RB}$ can be set, for example at one half of the difference between the reflected intensity in the red zone minus the reflect intensity in the green zone (i.e., |R−B|/2). From there, the threshold can be experimentally optimized.

$T_{GB}$ is a threshold value that establishes a minimum difference between the intensity G and the intensity B of the Green and blue reflected illumination from the bar code respectively to differentiate green from blue. In one example embodiment, the intensity of reflected light from a known green bar can be measured in the green and blue zones. The threshold $T_{GB}$ can be set, for example at one half of the difference between the reflected intensity in the green zone minus the reflect intensity in the blue zone (i.e., |G−B|/2). From there, the threshold can be experimentally optimized.

In each of the above examples, the ambient light conditions (if ambient light strikes the bar code in use) should be expected lighting conditions for use of the color barcode reader hardware, and other lighting conditions should be tested, and the values optimized for all applicable lighting conditions. Those skilled in the art will appreciate that other methods can be used to find and optimize the threshold values over varying ambient light conditions as well as over variations in hardware configuration, intensity of light in the three zones, etc.

Based on this analysis the bar colors can be determined at 168. If the process completes successfully at 170 for the current bar, a determination is made at 174 as to whether or not the last bar has been processed. If not, the process increments to the next bar at 178 and returns to 158. Once all bars are processed, the decoding process is deemed successful at 182 and the process returns at 186. If the color of any of the bars cannot be determined, the process fails at 190 and suitable action is taken. The process then returns at 186.

Figure 6A:
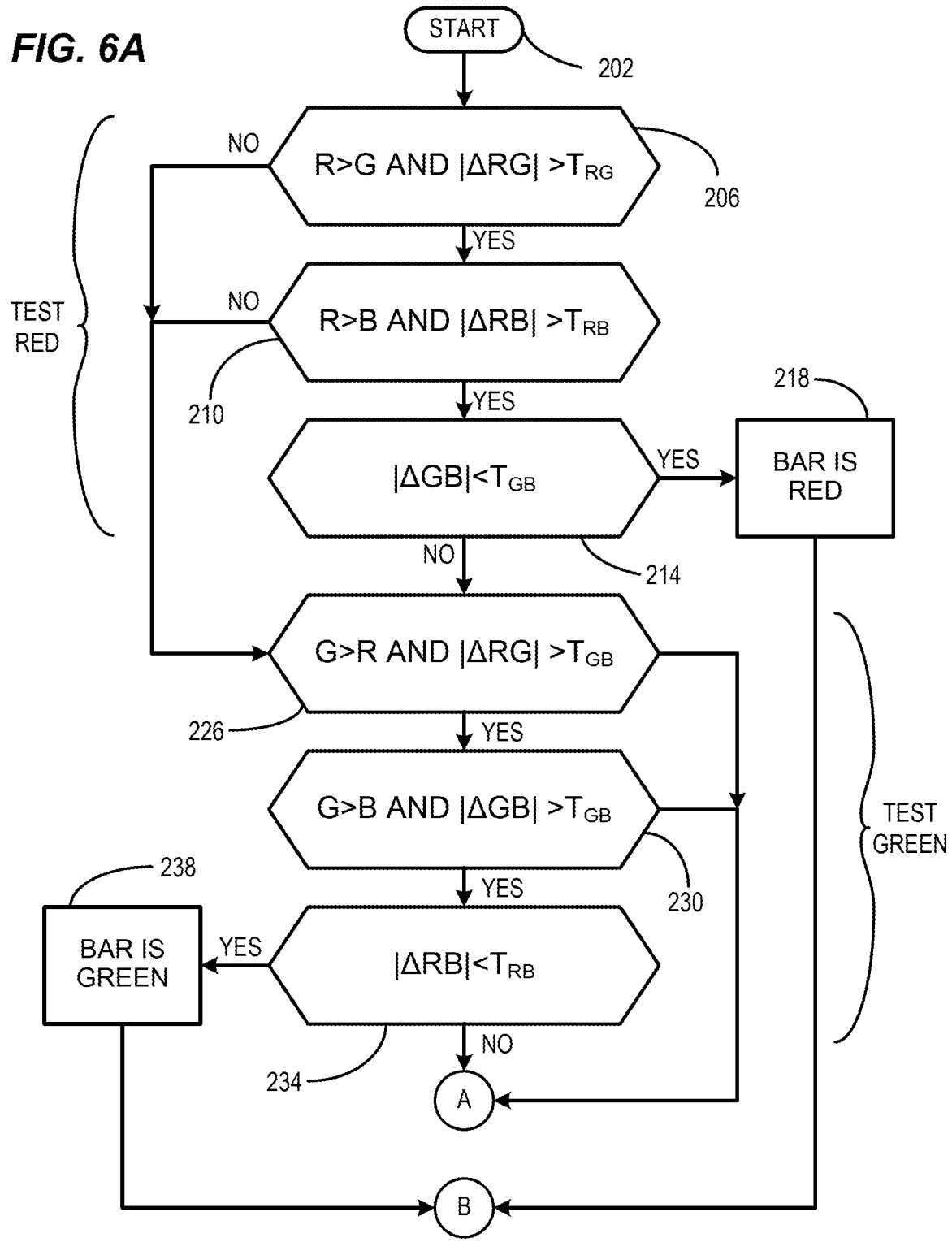
FIGS. 6A and 6B is an example flow chart of an example detailed color decoding process consistent with certain embodiments of the present invention.
Figure 6B:
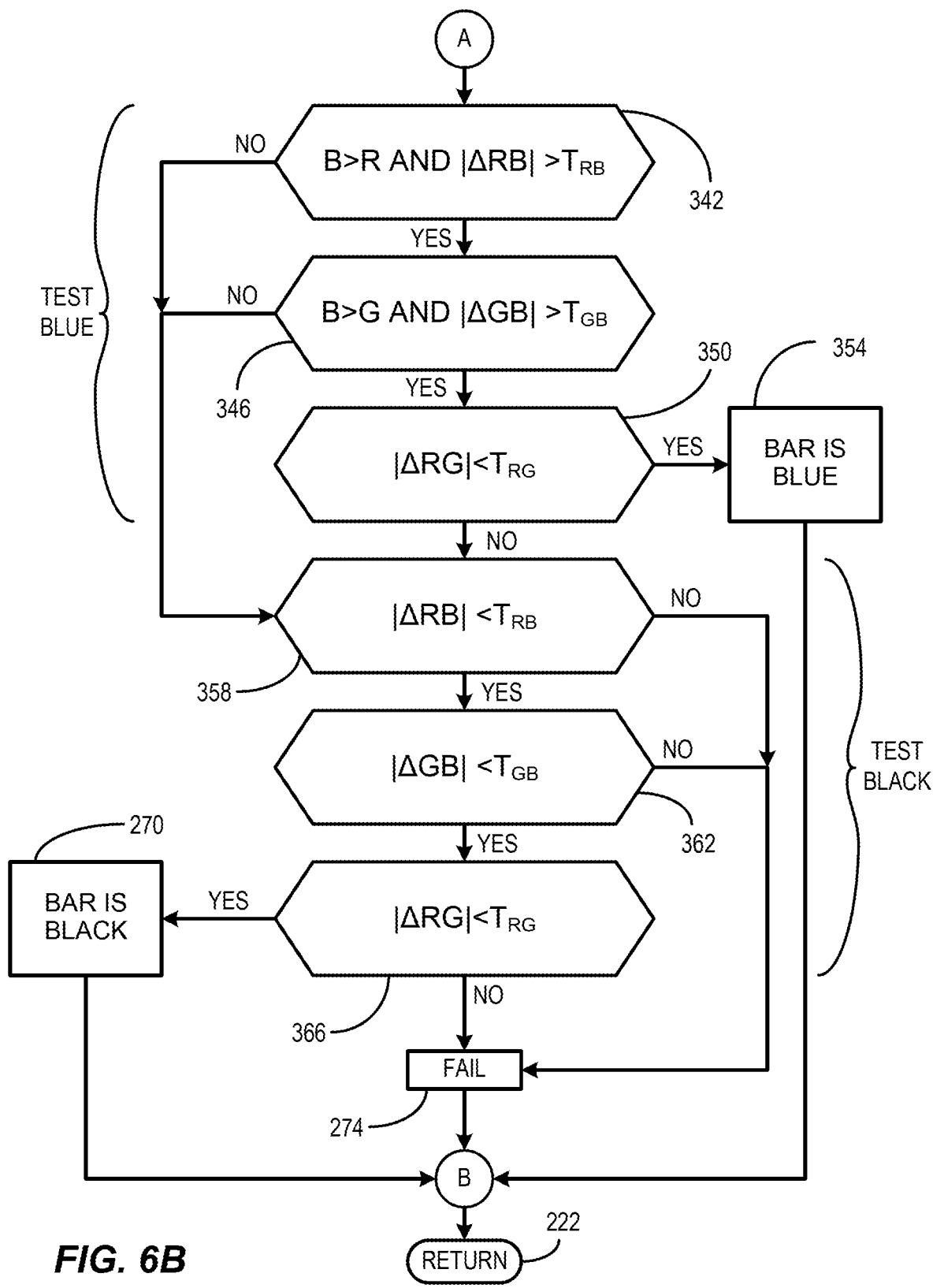

The color decoding process is described in conjunction with FIGS. 6A and 6B. In this process, the brightness of each bar with the three different colors of illumination are compared as are the difference values of each pair as described above with ΔRG=Red light signal−Green light signal=R−G; ΔRB=Red light signal−Blue light signal=R−B; and AGB=Green light signal−Blue light signal=G−B.

In order to make a determination about the color of each bar, three thresholds are established—one for each of the three RG, RB, and GB combinations and which are referred to as $T_{RG}$, $T_{RB}$, and $T_{GB}$ as discussed above. This leads to the following four sets of comparisons that can be done for each case to determine the color of a bar as follows:

For a red bar:

$R>G$ and $|\Delta RG|>T_{RG}$;

$R>B$ and $|\Delta RB|>T_{RB}$; and $|\Delta GB|<T_{GB}$.

For a green bar:

$G>R$ and $|\Delta RG|>T_{RG}$;

$G>B$ and $|\Delta GB|)>T_{GB}$; and $|\Delta RB|<T_{RB}$.

For a blue bar:

$B>R$ and $|\Delta RB|>T_{RB}$;

$B>G$ and $|\Delta GB|>T_{GB}$; and $|\Delta RG|<T_{RG}$.

For a black bar:

$|\Delta RB|<T_{RB}$;

$|\Delta GB|<T_{GB}$; and $|\Delta RG|<T_{RG}$.

The above four sets of comparisons can be generalized for three colors by letting R, G and B represent any three suitable colors C1, C2 and C3 and appropriately substituting therefor in each of the comparisons. In such case, the threshold $T_{RG}$ could become, for example, $T_{C1C2}$; and, the value of |ΔRG| would become |ΔC1C2| for example.

For certainty in decoding the proper color, the present example checks each of these criteria for each color (and black) in order to arrive at a color assignment for each bar in the barcode.

Referring now to FIG. 6A and FIG. 6B, an example flow chart of the color decoding process 200 represented by 164 and 168 of FIG. 5 is presented. It is noted that the order of operations can be changed without departing from the present teachings. Moreover, if less certainty as to the colors is acceptable, certain of the tests can be omitted.

The process 200 starts at 202 where the tests R>G and |ΔRG|>TRG are made. If the comparisons are true, the second test is applied at 210 which checks to see if R>B and |ΔRB|>TRB are true. If so, the third test is applied at 214 to check to see if |ΔGB|<TGB. If all of these tests are passed, the process determines that the current bar is red at 218 and the process 200 returns this answer at 222. The three tests of 206, 210, and 214 are designated by a bracket as "test red" for convenience.

If, at 206, 210 or 214 any of the tests are failed, the process proceeds to test for green as indicated by the bracket starting at 226 where the signal levels are tested to see if G>R and |ΔRG|>TGB. If so, the next test to see if G>B and |AGB|>TGB is applied at 230. If that test is passed, then the final green test is applied at 234 to see if |ΔRB|<TRB. If all three of these tests are passed, then the process determines that the current bar is green at 238. The process can then return at 222. If any of the three tests fail at 226, 230, or 234, the process determines that the bar is not green and proceeds to the blue test starting at 342.

The blue test proceeds much like the red and green test with the comparisons of B>R and |ΔRB|>$T_{RB}$ carried out at 342. If the result is positive, the next test at 346 is carried out. At 346, the process determines if B>G and |ΔGB|>TGB and if so proceeds to 350 to determine if |ΔRG|<TRG. If all three blue tests are passed, the process determines that the current bar is blue at 354 and the process returns at 222.

If any of the tests at 342, 346, or 350 are not passed as positive for blue, then the process proceeds to the black tests starting at 358. At 358, the process tests to see if |ΔRB|<TRB and if so, proceeds to 362. At 362, the process checks to see if |ΔGB|<TGB and if so the process proceeds to 366 to see if |ΔRG|<TRG. If so, the current bar is determined to be a black bar at 370 and the process returns at 222.

If there are failures at the red, green and blue tests, the process proceeds to 374 where a failure to decode is determined and suitable error processing can be implemented. In any case, the process then returns at 222.

While embodiments consistent with the present invention have been described primarily using three colors such as red, green, and blue, in other variations, two or more colors could be used, for example, when a more limited palate of colors is to be detected. In those cases, a method consistent with the present teachings involves simultaneously illuminating the color barcode with at least two spatially separate light zones in a manner that illuminates each bar of the color barcode with each of the at least two spatially separate light zones. In this case the at least two light zones are each illuminated by a different color such as two of red, green and blue. A monochrome image of light reflected from of the color barcode includes each of the bars in the barcode illuminated by each of the at least two light zones. For each bar in the color barcode, the process determines a color of the bar by analysis of the intensity of the light captured in the image of the reflected light intensity for each bar in each of the at least two spatially separated light zones. In this example, the intensity of the light reflected from the color barcode and captured in the image is represented by N colors C1 through CN; the color of each bar is determined by comparing the relative intensity of the values of C1 through CN. The color of each bar is further analyzed by comparison of the relative intensity of the differences between the values of C1, C2, and C3 with threshold intensity levels. Many other variations are possible consistent with the present teachings.

Many variations are possible within the bounds of the present teachings. For example, while three LEDs are shown as distinct LEDs, all three could be integrated in one LED element with three LED dies. Further, the source could be different colors than those described. The order of the processes described can be rearranged in any functional order and the tests for red, green, blue and black can be modified or simplified. The method for devising the thresholds as described can be modified or determined experimentally without departing from the present teachings.

In other variations, for example, a color barcode might utilize only red, blue, and black bars (or other combinations). In this example, two light zones (red and blue) could be used in a manner similar to that disclosed above to recognize red, blue, and black bars. Other variations will occur to those skilled in the art upon consideration of the present teachings.

To supplement the present disclosure, this application incorporates entirely by reference the following commonly assigned patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123; 8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; U.S. patent No. D702,237;

U.S. Pat. Nos. 8,740,082; 8,740,085; 8,746,563; 8,750,445; 8,752,766; 8,756,059; 8,757,495; 8,760,563; 8,763,909; 8,777,108; 8,777,109; 8,779,898; 8,781,520; 8,783,573; 8,789,757; 8,789,758; 8,789,759; 8,794,520; 8,794,522; 8,794,525; 8,794,526; 8,798,367; 8,807,431; 8,807,432; 8,820,630; 8,822,848; 8,824,692; 8,824,696; 8,842,849; 8,844,822; 8,844,823; 8,849,019; 8,851,383; 8,854,633; 8,866,963; 8,868,421; 8,868,519; 8,868,802; 8,868,803; 8,870,074; 8,879,639; 8,880,426; 8,881,983; 8,881,987; 8,903,172; 8,908,995; 8,910,870; 8,910,875; 8,914,290; 8,914,788; 8,915,439; 8,915,444; 8,916,789; 8,918,250; 8,918,564; 8,925,818; 8,939,374; 8,942,480; 8,944,313; 8,944,327; 8,944,332; 8,950,678; 8,967,468; 8,971,346; 8,976,030; 8,976,368; 8,978,981; 8,978,983; 8,978,984; 8,985,456; 8,985,457; 8,985,459; 8,985,461; 8,988,578; 8,988,590; 8,991,704; 8,996,194; 8,996,384; 9,002,641; 9,007,368; 9,010,641; 9,015,513; 9,016,576; 9,022,288; 9,030,964; 9,033,240; 9,033,242; 9,036,054; 9,037,344; 9,038,911; 9,038,915; 9,047,098; 9,047,359; 9,047,420; 9,047,525; 9,047,531; 9,053,055; 9,053,378; 9,053,380; 9,058,526; 9,064,165; 9,064,167; 9,064,168; 9,064,254; 9,066,032; 9,070,032;

U.S. Design patent No. D716,285;
U.S. Design patent No. D723,560;
U.S. Design patent No. D730,357;
U.S. Design patent No. D730,901;
U.S. Design patent No. D730,902;
U.S. Design patent No. D733,112;
U.S. Design patent No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;

U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;

U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILEPHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HANDHELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HANDHELD DIMENSIONER WITH DATA-QUALITY INDICATION filed Oct. 21, 2014 (Laffargue et al.);
U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);
U.S. patent application Ser. No. 14/531,154 for DIRECTING AN INSPECTOR THROUGH AN INSPECTION filed Nov. 3, 2014 (Miller et al.);
U.S. patent application Ser. No. 14/533,319 for BARCODE SCANNING SYSTEM USING WEARABLE DEVICE WITH EMBEDDED CAMERA filed Nov. 5, 2014 (Todeschini);
U.S. patent application Ser. No. 14/535,764 for CONCATENATED EXPECTED RESPONSES FOR SPEECH RECOGNITION filed Nov. 7, 2014 (Braho et al.);
U.S. patent application Ser. No. 14/568,305 for AUTO-CONTRAST VIEWFINDER FOR AN INDICIA READER filed Dec. 12, 2014 (Todeschini);
U.S. patent application Ser. No. 14/573,022 for DYNAMIC DIAGNOSTIC INDICATOR GENERATION filed Dec. 17, 2014 (Goldsmith);
U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method of decoding a color barcode, comprising:
   simultaneously illuminating the color barcode with at least two spatially separate light zones in a manner that illuminates each bar of the color barcode with each light zone of the at least two spatially separate light zones, wherein the at least two spatially separate light zones are each illuminated by a different color;
   capturing a monochrome image of light reflected from the color barcode;
   for a bar in the color barcode,
      computing a difference between a first relative intensity of a first color reflected from the bar and a second relative intensity of a second color reflected from the bar; and
      determining a color of the bar based on a comparison of the difference with a predetermined threshold.

2. The method according to claim 1, where an intensity of the light reflected from the color barcode and captured in the monochrome image is represented by N colors C1 through CN; and
   where determining the color of the bar is carried out by determining the relative intensity of the values of C1 through CN.

3. The method according to claim 2, where determining the color of the bar is further carried out by comparison of the relative intensity of the differences between the values of C1, C2 and C3 with threshold intensity levels.

4. The method according to claim 1, where determining the color of the bar is carried out by comparison of the relative intensity of the differences between the values of C1, C2 and C3 with predetermined threshold intensity levels.

5. The method according to claim 1, where the colors of the at least two spatially separate light zones comprise at least two of red, green, and blue light.

6. The method according to claim 5, where an intensity of the light reflected from the color barcode and captured in the monochrome image is represented by R, G and B for the intensity of the red, green and blue light respectively; and
where determining the color of the bar is carried out by determining the relative intensity of the values of R, G, and B.

7. The method according to claim 6, where determining the color of the bar is further carried out by comparison of the relative intensity of the differences between the values of R, G and B with threshold intensity levels.

8. The method according to claim 5, where an intensity of the light reflected from the color barcode and captured in the monochrome image is represented by R, G and B for the intensity of the red, green and blue light respectively; and
where determining the color of the bar is carried out by comparison of the relative intensity of the differences between the values of R, G, and B with threshold intensity levels.

9. The method according to claim 5, where an intensity of the light reflected from the color barcode and captured in the monochrome image is represented by R, G, and B for the intensity of the red, green, and blue light respectively;
where the bar is determined to be red if:

$R > G$ and $|\Delta RG| > T_{RG}$;

$R > B$ and $|\Delta RB| > T_{RB}$; and $|\Delta GB| < T_{GB}$, where $|\Delta RB|$ is the absolute value of the difference between R and B, where $|\Delta GB|$ is the absolute value of the difference between G and B, and where $|\Delta RG|$ is the absolute value of the difference between R and G, and where $T_{RG}$, $T_{RB}$ and $T_{GB}$ are predetermined threshold values.

10. The method according to claim 5, where an intensity of the light reflected from the color barcode and captured in the monochrome image is represented by R, G, and B for the intensity of the red, green, and blue light respectively;
where the bar is determined to be green if:

$G > R$ and $|\Delta RG| > T_{RG}$;

$G > B$ and $|\Delta GB| > T_{GB}$; and $|\Delta RB| < T_{RB}$, where $|\Delta RB|$ is the absolute value of the difference between R and B, where $|\Delta GB|$ is the absolute value of the difference between G and B, and where $|\Delta RG|$ is the absolute value of the difference between R and G, and where $T_{RG}$, $T_{RB}$ and $T_{GB}$ are predetermined threshold values.

11. The method according to claim 5, where an intensity of the light reflected from the color barcode and captured in the monochrome image is represented by R, G, and B for the intensity of the red, green, and blue light respectively;
where the bar is determined to be blue if:

$B > R$ and $|\Delta RB| > T_{RB}$;

$B > G$ and $|\Delta GB| > T_{GB}$; and $|\Delta RG| < T_{RG}$, where $|\Delta RB|$ is the absolute value of the difference between R and B, where $|\Delta GB|$ is the absolute value of the difference between G and B, and where $|\Delta RG|$ is the absolute value of the difference between R and G, and where $T_{RG}$, $T_{RB}$ and $T_{GB}$ are predetermined threshold values.

12. The method according to claim 5, where an intensity of the light reflected from the color barcode and captured in the monochrome image is represented by R, G, and B for the intensity of the red, green, and blue light respectively;
where the bar is determined to be black if:

$|\Delta RB| < T_{RB}$;

$|\Delta GB| < T_{GB}$; and $|\Delta RG| < T_{RG}$;

where $|\Delta RB|$ is the absolute value of the difference between R and B, where $|\Delta GB|$ is the absolute value of the difference between G and B, and where $|\Delta RG|$ is the absolute value of the difference between R and G, and where $T_{RG}$, $T_{RB}$ and $T_{GB}$ are predetermined threshold values.

13. The method according to claim 5, where an intensity of the light reflected from the color barcode and captured in the monochrome image is represented by R, G, and B for the intensity of the red, green, and blue light respectively;
where the bar is determined to be red if:

$R > G$ and $|\Delta RG| > T_{RG}$, $R > B$ and $|\Delta RB| > T_{RB}$, and $|\Delta GB| < T_{GB}$;

where the bar is determined to be green if:

$G > R$ and $|\Delta RG| > T_{RG}$, $G > B$ and $|\Delta GB| > T_{GB}$, and $|\Delta RB| < T_{RB}$;

where the bar is determined to be blue if:

$B > R$ and $|\Delta RB| > T_{RB}$, $B > G$ and $|\Delta GB| > T_{GB}$, and $|\Delta RG| < T_{RG}$; and where the bar is determined to be black if:

$|\Delta RB| < T_{RB}$, $|\Delta GB| < T_{GB}$, and $|\Delta RG| < T_{RG}$;

where $|\Delta RB|$ is the absolute value of the difference between R and B, where $|\Delta GB|$ is the absolute value of the difference between G and B, and where $|\Delta RG|$ is the absolute value of the difference between R and G, and where $T_{RG}$, $T_{RB}$ and $T_{GB}$ are predetermined threshold values.

14. A method of decoding a color barcode, comprising:
simultaneously illuminating the color barcode with three spatially separated light zones in a manner that illuminates each bar of the color barcode with each light zone of the three spatially separated light zones, wherein the three spatially separated light zones are illuminated by red light, green light and blue light respectively;
capturing a monochrome image of light reflected from the color barcode;

for a bar in the color barcode,
    computing a difference between a first relative intensity of a first color reflected from the bar and a second relative intensity of a second color reflected from the bar; and
    determining a color of the bar based on a comparison of the difference with a predetermined threshold.

15. The method according to claim 14, where an intensity of the light reflected from the color barcode and captured in the monochrome image is represented by R, G and B for the intensity of the red, green and blue light respectively; and
    where determining the color of the bar is carried out by determining the relative intensity of the values of R, G, and B.

16. The method according to claim 15, where determining the color of the bar is further carried out by comparison of the relative intensity of the differences between the values of R, G and B with threshold intensity levels.

17. The method according to claim 15, where an intensity of the light reflected from the color barcode and captured in the monochrome image is represented by R, G, and B for the intensity of the red, green, and blue light respectively;
    where the bar is determined to be red if:

$R>G$ and $|\Delta RG|>T_{RG}$, $R>B$ and $|\Delta RB|>T_{RB}$, and $|\Delta GB|<T_{GB}$;

where the bar is determined to be green if:

$G>R$ and $|\Delta RG|>T_{RG}$, $G>B$ and $|\Delta GB|>T_{GB}$, and $|\Delta RB|<T_{RB}$; and where the bar is determined to be blue if:

$B>R$ and $|\Delta RB|>T_{RB}$, $B>G$ and $|\Delta GB|>T_{GB}$, and $|\Delta RG|<T_{RG}$, and where $|\Delta RB|$ is the absolute value of the difference between R and B, where $|\Delta GB|$ is the absolute value of the difference between G and B, and where $|\Delta RG|$ is the absolute value of the difference between R and G, and where $T_{RG}$, $T_{RB}$ and $T_{GB}$ are predetermined threshold values.

18. The method according to claim 17, where the bar is determined to be black if:

$|\Delta RB|<T_{RB}$;

$|\Delta GB|<T_{GB}$; and $|\Delta RG|<T_{RG}$.

19. A method of decoding a color barcode, comprising:
    simultaneously illuminating the color barcode with a plurality of spatially separated light zones in a manner that illuminates each bar of the color barcode with each light zone of the plurality of spatially separated light zones, wherein the plurality of spatially separated light zones are each illuminated by a different color;
    capturing a monochrome image of light reflected from the color barcode;
    for a bar in the color barcode,
        computing a difference between a first relative intensity of a first color reflected from the bar and a second relative intensity of a second color reflected from the bar; and
        determining a color of the bar based on a comparison of the difference with a predetermined threshold.

20. The method according to claim 19, where determining the color of the bar in the color barcode is carried out by comparison of the relative intensity of differences between values of each color illuminating the color barcode with threshold intensity levels.

* * * * *